(12) United States Patent
Dayalan et al.

(10) Patent No.: US 12,334,733 B2
(45) Date of Patent: Jun. 17, 2025

(54) CONTROL OF A LOAD FACILITY IN RESPONSE TO A DEMAND EVENT

(71) Applicant: Trane International Inc., Davidson, NC (US)

(72) Inventors: Udhaya Kumar Dayalan, White Bear Lake, MN (US); James Kenneth McKeever, Blaine, MN (US); Brian A. Kirkman, Shoreview, MN (US)

(73) Assignee: Trane International Inc., Davidson, NC (US)

( * ) Notice: Subject to any disclaimer, the term of this patent is extended or adjusted under 35 U.S.C. 154(b) by 694 days.

(21) Appl. No.: 17/657,507

(22) Filed: Mar. 31, 2022

(65) Prior Publication Data

US 2023/0318295 A1 Oct. 5, 2023

(51) Int. Cl.

| | |
|---|---|
| *G05B 15/00* | (2006.01) |
| *G05B 9/02* | (2006.01) |
| *G05B 11/01* | (2006.01) |
| *G05B 13/02* | (2006.01) |
| *G05B 15/02* | (2006.01) |
| *G05D 3/12* | (2006.01) |
| *H02J 3/14* | (2006.01) |

(52) U.S. Cl.
CPC .......... *H02J 3/144* (2020.01); *H02J 2310/12* (2020.01)

(58) Field of Classification Search
CPC .......... H02J 3/144; H02J 2310/12; H02J 3/28; H02J 2310/60; H02J 13/00032; H02J 13/00001; H02J 3/00; H02J 13/00004; H02J 13/00022; H02J 2203/10; G06Q 10/04; G06Q 10/0631; G06Q 30/0201; G06Q 30/0207; G06Q 50/163; G06Q 50/06; Y02B 70/3225; Y04S 20/222
USPC ............ 700/1, 9, 11, 14, 19, 22, 28, 33, 79, 700/275–276, 286, 291–293, 295–302
See application file for complete search history.

(56) References Cited

U.S. PATENT DOCUMENTS

| | | | |
|---|---|---|---|
| 3,872,286 | A | 3/1975 | Putman |
| 5,444,851 | A | 8/1995 | Woest |
| 5,462,225 | A | 10/1995 | Massara et al. |
| 5,522,044 | A | 5/1996 | Pascucci et al. |

(Continued)

FOREIGN PATENT DOCUMENTS

| | | |
|---|---|---|
| CA | 2140559 A1 | 7/1996 |
| GB | 2514001 A | 11/2014 |

(Continued)

*Primary Examiner* — Yolanda R Cumbess
(74) *Attorney, Agent, or Firm* — WOMBLE BOND DICKINSON (US) LLP

(57) ABSTRACT

A method and apparatus for controlling a load facility in response to a demand event. The method includes defining a plurality of resources of the load facility based on user input, establishing a response strategy for the demand event, and organizing the resources into the response strategy that specifies the resources and times during the demand event at which the resources are called to execute the one or more measures to reduce power consumption of one or more of the electrical devices, different ones of the resources called at different times during the demand event, and at least one of the resources called to execute the one or more measures, and further including executing the response strategy to reduce demand on the power grid from the load facility during the demand event.

28 Claims, 9 Drawing Sheets

(56) References Cited

U.S. PATENT DOCUMENTS

| | | |
|---|---|---|
| 5,598,566 A | 1/1997 | Gottschalk et al. |
| 5,930,773 A | 7/1999 | Crooks et al. |
| 5,962,989 A | 10/1999 | Baker |
| 7,501,713 B2 | 3/2009 | Fein et al. |
| 8,352,083 B2 | 1/2013 | Ng |
| 8,410,351 B1 | 4/2013 | Gu |
| 8,412,654 B2 | 4/2013 | Montalvo |
| 8,463,449 B2 | 6/2013 | Sanders |
| 8,473,250 B2 | 6/2013 | Adest et al. |
| 8,556,188 B2 | 10/2013 | Steinberg |
| 8,626,354 B2 | 1/2014 | Walter et al. |
| 8,630,744 B2 | 1/2014 | Walter et al. |
| 8,829,799 B2* | 9/2014 | Recker ............... H05B 47/16 315/159 |
| 8,840,033 B2 | 9/2014 | Steinberg |
| 8,843,238 B2 | 9/2014 | Wenzel et al. |
| 8,880,231 B2 | 11/2014 | Boucher et al. |
| 8,907,202 B1 | 12/2014 | Brusaw et al. |
| 8,908,202 B2 | 12/2014 | Ito |
| 8,982,590 B2 | 3/2015 | Giraut et al. |
| 9,007,460 B2 | 4/2015 | Schmidt et al. |
| 9,054,559 B2 | 6/2015 | Marks De Chabris |
| 9,153,001 B2 | 10/2015 | Walter et al. |
| 9,207,698 B2* | 12/2015 | Forbes, Jr. ............... H02J 3/32 |
| 9,422,922 B2 | 8/2016 | Sant'anselmo et al. |
| 9,450,408 B2 | 9/2016 | Lu et al. |
| 9,471,045 B2 | 10/2016 | Scelzi |
| 9,843,193 B2 | 12/2017 | Getsla |
| 9,997,914 B2 | 6/2018 | Day et al. |
| 10,007,999 B2 | 6/2018 | Hamann et al. |
| 10,079,317 B2 | 9/2018 | Gonatas |
| 10,103,548 B2 | 10/2018 | He et al. |
| 10,110,002 B2 | 10/2018 | Imhof et al. |
| 10,133,283 B2 | 11/2018 | Bergman et al. |
| 10,241,528 B1 | 3/2019 | Frader-Thompson et al. |
| 10,467,639 B2 | 11/2019 | McCurnin et al. |
| 10,670,288 B2 | 6/2020 | Thomle et al. |
| 10,762,454 B2 | 9/2020 | Koch |
| 10,901,379 B2 | 1/2021 | Bunker et al. |
| 11,073,849 B1 | 7/2021 | Frader-Thompson et al. |
| 11,255,562 B2 | 2/2022 | Ho |
| 2005/0116671 A1 | 6/2005 | Minami et al. |
| 2007/0043478 A1 | 2/2007 | Ehlers et al. |
| 2009/0078300 A1 | 3/2009 | Ang et al. |
| 2009/0293523 A1 | 12/2009 | Bittner et al. |
| 2010/0286937 A1 | 11/2010 | Hedley et al. |
| 2011/0046798 A1 | 2/2011 | Imes et al. |
| 2011/0289953 A1 | 12/2011 | Alston |
| 2012/0029897 A1 | 2/2012 | Cherian et al. |
| 2012/0191252 A1 | 7/2012 | Rockenfeller et al. |
| 2012/0271473 A1 | 10/2012 | Koch |
| 2013/0043724 A1 | 2/2013 | Daniels et al. |
| 2013/0054211 A1 | 2/2013 | Franke et al. |
| 2013/0054758 A1 | 2/2013 | Imes et al. |
| 2013/0054863 A1 | 2/2013 | Imes et al. |
| 2013/0073099 A1 | 3/2013 | Bronicki |
| 2013/0090777 A1 | 4/2013 | Lu et al. |
| 2013/0138961 A1 | 5/2013 | Tsuji et al. |
| 2013/0168961 A1 | 7/2013 | Stahlkopf et al. |
| 2013/0192216 A1 | 8/2013 | Berlin et al. |
| 2013/0257157 A1 | 10/2013 | Sun |
| 2013/0338837 A1 | 12/2013 | Hublou et al. |
| 2014/0078793 A1 | 3/2014 | Sivakumar et al. |
| 2014/0129040 A1 | 5/2014 | Emadi et al. |
| 2014/0249680 A1 | 9/2014 | Wenzel |
| 2014/0277761 A1 | 9/2014 | Matsuoka et al. |
| 2014/0277769 A1 | 9/2014 | Matsuoka et al. |
| 2014/0277795 A1 | 9/2014 | Matsuoka et al. |
| 2014/0278107 A1 | 9/2014 | Kerrigan et al. |
| 2014/0278108 A1 | 9/2014 | Kerrigan et al. |
| 2014/0285010 A1 | 9/2014 | Cameron |
| 2014/0330611 A1 | 11/2014 | Steven et al. |
| 2014/0372577 A1 | 12/2014 | Hui et al. |
| 2015/0019032 A1 | 1/2015 | Koch et al. |
| 2015/0066404 A1 | 3/2015 | Scelzi |
| 2015/0168001 A1 | 6/2015 | Steinberg |
| 2015/0170171 A1 | 6/2015 | McCurnin et al. |
| 2015/0178865 A1 | 6/2015 | Anderson et al. |
| 2015/0214787 A1 | 7/2015 | Gerhardinger et al. |
| 2015/0229131 A1 | 8/2015 | Gerhardinger |
| 2016/0118846 A1 | 4/2016 | Huang et al. |
| 2016/0181807 A1 | 6/2016 | Day et al. |
| 2016/0201864 A1 | 7/2016 | Liu et al. |
| 2016/0329708 A1 | 11/2016 | Day |
| 2017/0089627 A1 | 3/2017 | Lee et al. |
| 2017/0169525 A1 | 6/2017 | Mokhtari et al. |
| 2018/0039891 A1 | 2/2018 | Hamann et al. |
| 2018/0197252 A1 | 7/2018 | Bollermann et al. |
| 2018/0275314 A1 | 9/2018 | Pavlovski et al. |
| 2018/0316221 A1 | 11/2018 | Dutta et al. |
| 2018/0331539 A1 | 11/2018 | Lee |
| 2019/0140446 A1 | 5/2019 | Day et al. |
| 2019/0165578 A1 | 5/2019 | Carr et al. |
| 2019/0249895 A1 | 8/2019 | Weyant et al. |
| 2019/0340709 A1 | 11/2019 | Elbsat et al. |
| 2021/0123771 A1 | 4/2021 | Vega et al. |
| 2023/0078874 A1* | 3/2023 | Sano ............... H02J 7/0013 700/295 |

FOREIGN PATENT DOCUMENTS

| | | |
|---|---|---|
| WO | 2013192432 | 12/2013 |
| WO | 2013192432 A1 | 12/2013 |

* cited by examiner

EXECUTION/ROTATION/RELEASE

PARENT/CHILD RESOURCES

420 — ACTIVATE A USER FORCED ROTATION STRATEGY, THE USER FORCED ROTATION STRATEGY BEING ACTIVATED BY USER INPUT AND WHEN ACTIVATED CAUSING A DEVIATION FROM EXECUTING THE RESPONSE STRATEGY, THE DEVIATION RESULTING IN A CALL EXECUTING THE ONE OR MORE MEASURES OF A GIVEN RESOURCE TO CEASE AND ANOTHER CALL TO EXECUTE THE ONE OR MORE MEASURES OF A DIFFERENT RESOURCE TO BE INITIATED

FIG. 4D

422 — DETERMINE AN ANTICIPATED AGGREGATE DECREASE IN THE DEMAND ON THE POWER GRID FROM THE RESPONSE STRATEGY, AND THAT THE ANTICIPATED AGGREGATE DECREASE IS LESS THAN THE SPECIFIED DECREASE

424 — NOTIFY THE USER

FIG. 4E

CONTROL OF A LOAD FACILITY IN RESPONSE TO A DEMAND EVENT

TECHNOLOGICAL FIELD

The present disclosure relates generally to an improved apparatus and method for controlling a load facility during a demand event to optimize various considerations during the response.

BACKGROUND

Electrical generating utilities generally negotiate production requirements with regional transmission organizations and independent system, transmission, or distribution system operators. These system operators are responsible for the operation of the electrical transmission system, commonly known as the power grid. System operators use a variety of techniques, collectively known as load balancing, to match power generation capabilities to demand. One common load-balancing technique are demand events. During these events incentives may be provided to consumers of electricity to change their electrical usage patterns by reducing loads and by time-shifting use from periods of overall high grid demand to periods where grid demand is lower. Similarly, consumers may be incentivized to increase demand during periods of high supply and low demand. In return, electrical consumers may be compensated in various forms such as by receiving reduced electrical rates or earned incentive payments.

The electric power industry considers demand events to be an increasingly valuable asset, and electrical consumers are looking to participate in these events in a more regular basis to take advantage of the various incentives. However, participation in the event typically imposes some form of sacrifice on an electrical consumer. For example, various electrical equipment will be operated below the standard or desired level. Often participation in a given demand event results in compromises to the occupant comfort and/or productivity for at a given facility.

Moreover, current facility responses to demand events are limited. These responses may control multiple electrical devices simultaneously and/or the process may provide for no customization by the consumer. Because the primary objective of the demand management program is often to limit the demand to minimize the consumption of electricity, there typically is little if any consideration given to other factors, which may impact the facility and/or the occupancies.

Accordingly, the present disclosure is directed to an improved apparatus and method for reducing the impact responding to a demand event may have on the occupants of the building. This may be done by various responses, which may prioritize considerations such as the comfort of the occupied spaces.

BRIEF SUMMARY

Example implementations provide apparatus and methods which allow for an improved response to a demand event. In some examples, the apparatus is configured to establish a response strategy for the demand event. The establishment of the response strategy may include selecting resources from the plurality of resources to respond to the demand event. The resources may be organized within the response strategy, and based on this organization the response strategy may specify the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event. The response strategy may then be executed to reduce demand on the power grid from the load facility during the demand event.

The response strategy may be established in various ways. In some examples, the response strategy specifies the resources and times during the demand event at which the resources are called to execute the one or more measures to reduce the power consumption of the one or more of the electrical devices to decrease demand on the power grid. For example, the response strategy is able to organize the resources in a manner that is able to adequately respond to the demand event. In some examples, the response strategy also takes into account other factors such as comfort considerations, user preference, or other considerations. In this way a more sophisticated response may be able to be performed.

The present disclosure thus includes, without limitation, the following example implementations.

Some example implementations provide an apparatus for controlling demand on a power grid from a load facility in response to a demand event, the load facility including electrical devices that are powered from power drawn from the power grid, the apparatus comprising: a memory configured to store computer-readable program code; and a processor configured to access the memory, and execute the computer-readable program code to cause the apparatus to at least: define a plurality of resources of the load facility based on user input, each resource including one or more of the electrical devices and one or more measures to reduce power consumption of the one or more of the electrical devices to decrease demand on the power grid; establish a response strategy for the demand event, including: select resources from the plurality of resources to respond to the demand event; and organize the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and execute the response strategy to reduce demand on the power grid from the load facility during the demand event.

Some example implementations provide a method of controlling demand on a power grid from a load facility in response to a demand event, the load facility including electrical devices that are powered from power drawn from the power grid, the method comprising: defining a plurality of resources of the load facility based on user input, each resource including one or more of the electrical devices and one or more measures to reduce power consumption of the one or more of the electrical devices to decrease demand on the power grid; establishing a response strategy for the demand event, including: selecting resources from the plurality of resources to respond to the demand event; and organizing the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and executing the response strategy to reduce demand on the power grid from the load facility during the demand event.

Some example implementations provide a computer-readable storage medium for controlling demand on a power grid from a load facility in response to a demand event, the load facility including electrical devices that are powered from power drawn from the power grid, the computer-readable storage medium being non-transitory and having computer-readable program code stored therein that, in response to execution by a processor, causes an apparatus to at least: define a plurality of resources of the load facility based on user input, each resource including one or more of the electrical devices and one or more measures to reduce power consumption of the one or more of the electrical devices to decrease demand on the power grid; establish a response strategy for the demand event, including: select resources from the plurality of resources to respond to the demand event; and organize the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and execute the response strategy to reduce demand on the power grid from the load facility during the demand event.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 4A, 4B, 4C, 4D and 4E are flowcharts illustrating various steps in a method of controlling electrical load on a power grid from a load facility using demand response, according to various example implementations.

DETAILED DESCRIPTION

Figure 1:
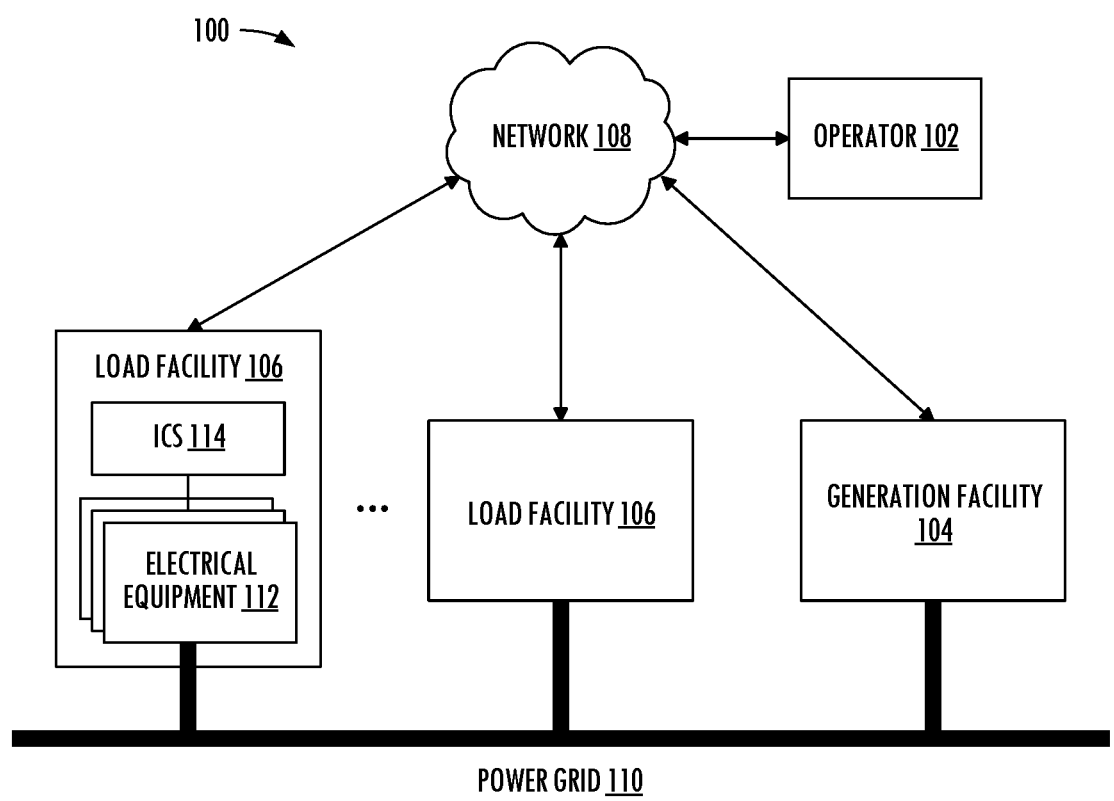
FIG. 1 illustrates an electric transmission and distribution system according to various example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

As indicated above, example implementations of the present disclosure are directed to response strategy for controlling an electrical load of a load facility during a demand event. The response strategy selecting the resources available to respond to the event and controlling the timing and prioritization of the resources during the response.

FIG. 1 illustrates an electric transmission and distribution (T&D) system 100 according to various example implementations of the present disclosure. As shown, the T&D system includes at least one system operator (at times more simply referred to as an operator 102). In various examples, the operator may be an independent system operator (ISO), transmission system operator (TSO), distribution system operator (DSO) or the like. The operator is in operable communication with at least one generation facility 104 and at least one load facility 106. In some examples, the operator, load facility and/or generation facility may communicate with one another across one or more networks 108 such as one or more telecommunications networks, computer networks or the like. In this regard, the system operator, load facility and/or generation facility may be wired or wirelessly coupled to the one or more networks.

The operator 102 may be configured to coordinate, control and monitor a power grid 110 (at times referred to as a T&D grid), including the transmission and/or distribution of electric power on the power grid. The generation facility 104 is configured to contribute power into the power grid through which power is delivered to the load facilities 106. The load facilities are generally facilities configured to draw power from the power grid. The load facilities include any consumer of electrical power, such as industrial facilities, institutional facilities, commercial facilities, residential facilities and the like. In some examples, the load facilities include buildings such as industrial buildings, institutional buildings, commercial buildings, residential buildings and the like. Even further, examples of suitable commercial buildings include office buildings, warehouses, retail buildings and the like.

As also shown, at least one load facility 106 includes electrical equipment 112 powered from power drawn from the power grid 110 by the load facilities. The electrical equipment may include, for example, mechanical, electrical, lighting, shading, access control, security systems and the like. As another example, the electrical equipment may include a heating, ventilation and air conditioning (HVAC) system and associated components such as air handling units, variable air volume (VAV) units, compressors, air movers, chillers, and ventilators. The load facility also includes an industrial control system (ICS) 114 such as a supervisory control and data acquisition (SCADA) system, distributed control system (DCS) or the like. A more specific example of a suitable DCS is a building automation system (BAS). The ICS is configured to provide some level of computerized central control of at least some of the electrical equipment within the load facility 106.

Figure 2:
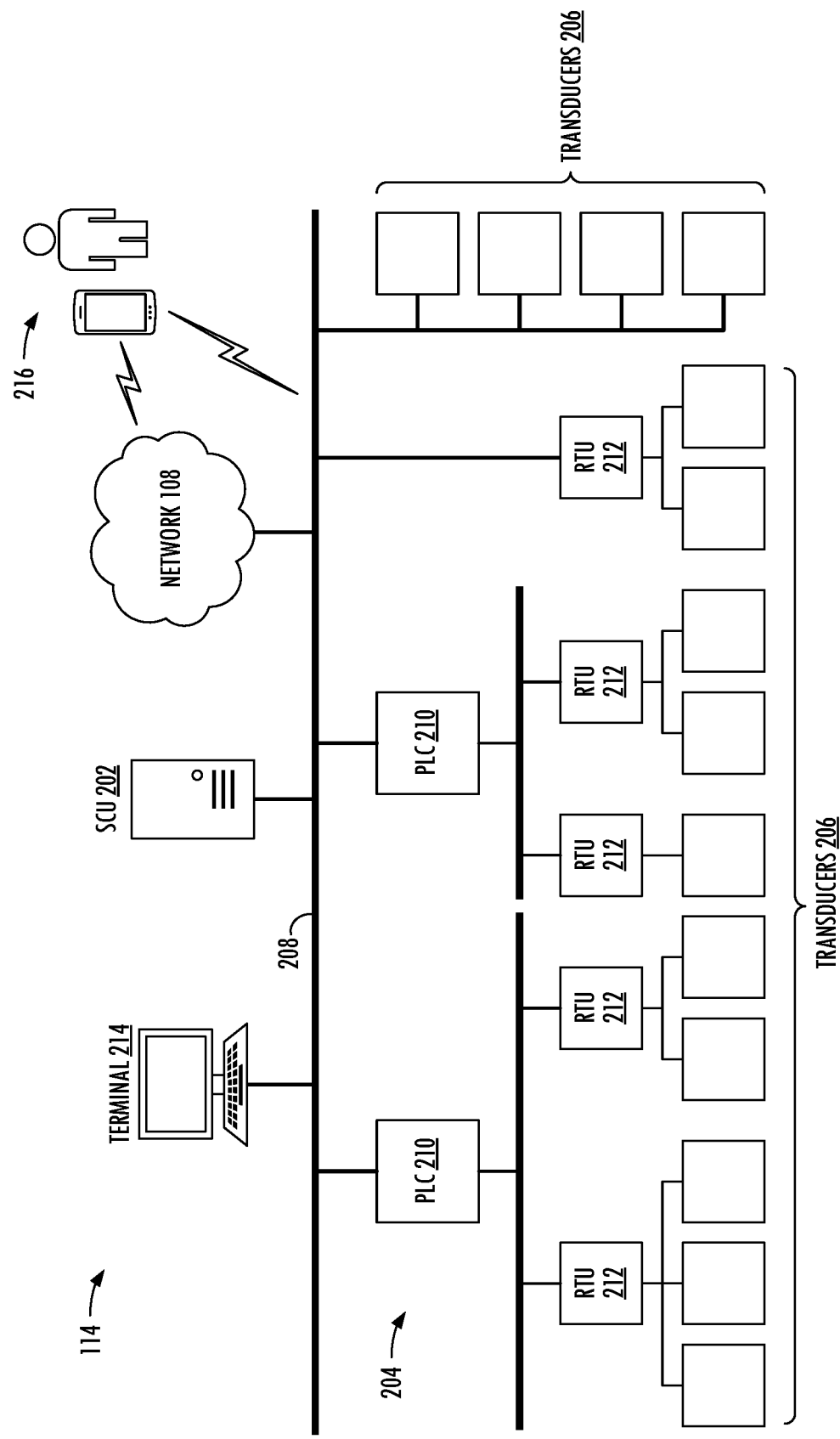
FIG. 2 illustrates an industrial control system for a load facility, according to some example implementations.

FIG. 2 more particularly illustrates the ICS 114 according to some example implementations. As shown, the ICS includes the supervisory control unit (SCU) 202 configured to enable communication with and/or control of the electrical equipment 112, such as by wired or wireless data links directly or across one or more networks. The ICS includes field connection units 204 to enable the SCU to communicate with the electrical equipment, and in particular transducers 206 including actuators and/or sensors in the load facility 106, some of which may be onboard the electrical equipment.

The SCU 202 and the field connection units 204 may communicate by wired or wireless data links directly or across one or more networks, such as a control network 208. Examples of suitable communication protocols for the control network include TCP/IP, BACnet, LonTalk, Modbus, ZigBee, Zwave, Wi-Fi, SIMPLE, Bluetooth and the like. The control network may also be coupled to the one or more networks 108.

In some examples, the SCU 202 may be implemented as a supervisory computer, and the respective field connection units may be implemented as programmable logic controllers (PLCs) 210, remote terminal units (RTUs) 212, or some combination of PLCs and RTUs. The SCU may further communicate with a terminal 214 configured to provide a human-machine interface (HMI) to the SCU. The SCU may be integrated, co-located, or communicate with one or more of the field connection units and/or transducers 206 by wired or wireless data links directly or across the control network.

A load-facility operator may access the ICS 114 in a number of different manners, such as via the terminal 214. As also shown, a load-facility operator 216 may access the ICS from a user device such as a mobile device, handheld computer or the like. The user device may be configured to access the ICS from the control network 208 via a local wireless connection to the control network, or through the one or more networks 108.

The SCU 202 is configured to communicate with the transducers 206 for communication and/or control of the load facility 106 and the electrical equipment 112, such as to enable the SCU to control mechanical, electrical, lighting, shading, access control, security systems, the HVAC system and associated components such as air handling units, VAV units, compressors, air movers, chillers, air purifiers and ventilators, and the like. In some particular examples, the transducers may include one or more actuators configured to control operation of electrical equipment. The transducers may also include one or more environmental sensors such as temperature sensors, humidity sensors, gas sensors like $CO_2$ sensors, occupancy sensors and the like.

According to example implementations of the present disclosure, the SCU 202 may be configured to control electrical load on the power grid 110 from the load facility 106 using demand response. The load facility includes a plurality of resources with respective amounts of electric power that are capable of being shed by the plurality of resources during a demand event to reduce demand on the power grid. Similarly, the load facility may include one or more resources with respective amounts of electric power that are capable of being consumed by the one or more resources during a demand event to increase demand on the power grid during a period of high supply. These amounts may be expressed in a number of different manners, such as in kilowatts (kW). The plurality of resources includes measures for modifying demand (reducing or increasing) on the power grid from electrical equipment 112 for a time interval, or otherwise modifying power consumption of the electrical equipment.

In the case of a demand event to reduce demand on the power grid 110, the resources may include, for example, temporarily reducing or interrupting power consumption of electrical equipment 112, shifting power consumption to another time interval, and using onsite power generation or storage instead of the power grid. A resource, then, may refer to one or more of the electrical devices and one or more measures to reduce power consumption of the one or more of the electrical devices to decrease demand on the power grid.

The apparatus, which may be SCU 202, may be configured to control demand on a power grid from a load facility in response to a demand event. The load facility may include electrical devices that are powered from power drawn from the power grid. The SCU may be configured to define a plurality of resources of the load facility based on user input. Each resource may include one or more of the electrical devices and one or more measures to reduce power consumption of the one or more of the electrical devices to decrease demand on the power grid.

For example, a load facility may have multiple different electrical devices powered by the power grid, and these electrical devices may be controlled in a variety of different ways. In some examples, the lighting in a given hallway circuit may be dimmed to reduce power, and in other examples, the lighting may be turned off completely. Similarly, HVAC system may be controlled based on various set points. For example, setting a zone temperature setpoint may be moved up or down a few degrees, depending on the season. This adjustment may impact multiple electrical devices, e.g., an air handler unit supplying air to a conditioned space, VAV units, etc. Thus, the plurality of resources within a load facility may be defined in multiple ways. A single electrical device or circuit may be included in multiple different resources, e.g., dimming the lights may be defined as a given resource and turning off the lights maybe a separate resource. Similarly, changing a setup for a given HVAC space or device may be a separate resource and may impact multiple electrical devices. Other methods for defining the resources are contemplated herein.

In some examples, the user defines the plurality of resources in a desired way. The user may define the various resources within the facility based on desired groupings of devices and/or load reducing techniques. In this way the resources may be customized for the facility, a given demand event, or other considerations. For example, certain facilities may have critical systems, which must always be operational, e.g., power for electrical servers, ventilation in operating rooms, etc. In addition, operators may understand that certain resources are better suited to respond to certain demand events or may customize the resources in other ways.

In some examples, the user defines some or all of the resources directly. In other examples, the user may define the resources by selecting a grouping of resources, which may be pre-defined. In some examples, resources or groupings of resources that are common to multiple different load facilities may be prepared, and the user may select whether to accept some or all of the settings. Similarly, in other examples, the user may select a given parameter or setting to define the resources. For example, a user may choose a resource that is related to an HVAC setpoint, which may result in the resource including one or more measures to control all the electrical devices related to that setpoint. Some or all of these techniques may be used.

In some examples, the apparatus, which may be SCU 202, is configured to establish a response strategy for the demand event. In some examples, establishment of the response strategy includes the SCU being configured to select resources from the plurality of resources to respond to the demand event. The SCU may be configured to organize the resources into the response strategy, and the response strategy may specify the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event. The SCU may also be configured to execute the response strategy to reduce demand on the power grid from the load facility during the demand event.

The response strategy may be established in various ways. In some examples, the response strategy specifies the resources and times during the demand event at which the resources are called to execute the one or more measures to reduce the power consumption of the one or more of the electrical devices to decrease demand on the power grid. For example, the response strategy is able to organize the resources in a manner that is able to adequately respond to the demand event. In some examples, the response strategy also takes into account other factors such as comfort considerations (e.g., 68° F.-75° F., 40%-60% relative humidity, etc.), user preference, or other considerations. In this way a more sophisticated response may be able to be performed.

In some examples, the response strategy organizes the resources based on prioritization. In this way, the response strategy sets the priority in which the various measures of the resources are executed to reduce power consumption at the facility and respond to the demand event. In addition, the response strategy may also identify resources that should (or may) be released during the demand event to allow the electrical device to return to normal operation. The measures for these resources may be released once the power reduction for the facility is sufficiently low. In some examples, the response strategy may execute the measure of one or more other measures of different resources to reduce the overall power consumption of a facility to a sufficiently low level, which may allow a measure for a separate resource to be released during the demand event.

In some examples, the response strategy may organize the resources for simultaneous response. In these examples, the measures for each of the selected resources may be executed at the same time and for the same duration. For example, during a given demand event all the selected resources may be called to execute the given time for the event. In these examples, the various resources may be selected for the event based on their relatively priority as well as the estimated reduction in electrical load the measure may provide. These resources may be selected in this manner until the estimated reduction satisfies the requirements of the given demand event, and the response strategy may execute the measures for these resources at the same time. In some examples, the measures may be executed for the same duration. In other examples, the duration at which the measures are executed may vary.

To walk through an example, a load facility may have three resources, and in this example, the resources may be:

| Resource #1 | Dim Hallway Lights | 8 kW |
|---|---|---|
| Resource #2 | Demand Limit Chiller | 15 kW |
| Resource #3 | Disable Terminal Electric Heat | 40 kW |

In the example above, the first resource, the hallways lights, is comprised of multiple sets of lights and associated lighting controls. The measure for this resource is dimming the hallway lights, which results in an estimated reduction of 8 kilowatts (kW). The second resource is a reduction in the demand capacity for the chiller. In this example, the measure sets a lower capacity value for the chiller, which results in an estimated reduction of 15 kW. The third resource includes 40 terminal electric heating units, and the measure for this resource disables these units as a single device. Turning them off results in a reduction of 40 kW power load.

In this example, if the demand event is a demand response event that requires the reduction of 20 kW, the response strategy may execute the measures for the various resources in a given order until the requirement is met. In this example, the first and second resources may be selected for the demand event to accomplish the reduction.

In examples where the demand event is a demand limiting event, the measures for the resources may be executed in an order. In some examples, the response strategy may pause between each step in the order. For example, all three of the resources may be selected for the demand event. The response strategy may then call the measures for the first and second resource to execute at a first time in order to respond to the demand event. The response strategy may then call the measure for the third resource, the terminal electric heating units, at a separate time to respond to the demand event.

The response strategy may also include releasing the measures for the various called resources, and this may be accomplished in various ways. For example, for the demand response event discussed above, the selected resources, the first and second resources, may be both released at the same time, potentially at the end of the demand response event. In other examples, e.g., for the demand limiting event discussed above, the measures for the various resources may be released at different times. In some examples, the measures are released one at a time to minimize or prevent "rebound". In the example discussed above, the measures for the first and second resources may be released once the measure for the third resource was called. In some examples, the measures for one of these resources, either the first or the second, is released first, and then the measure for the other resource is released. In other examples, the measures for both of these resources are released at the same time.

Figure 3A:
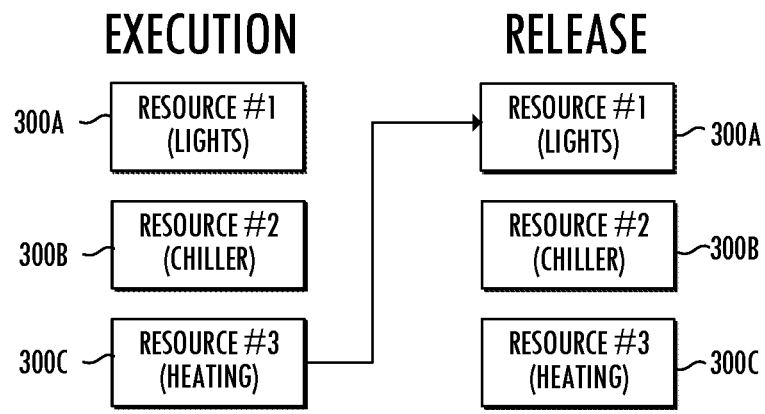
FIG. 3A illustrates an order for executing the measure of various resources and releasing these measures, according to some example implementations.
Figure 3B:
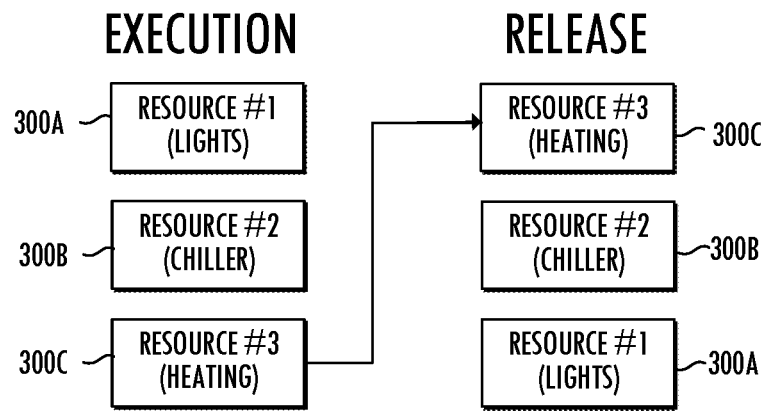
FIG. 3B illustrates an order for executing the measure of various resources and releasing these measures, according to some example implementations.

The response strategy may select and organize the resources in various orders. The release order may reflect the priority of the various resources or other factors. FIGS. 3A and 3B show illustrations of example ways in which a response strategy may order the resources, and this order may impact the resources that are selected for a given demand event and/or how the resources are called and released during the demand event.

FIG. 3A shows an example for organizing the resources (300A, 300B, and 300C) in the response strategy in an example progressive order. This order may be referred to as a first in/first out order. In this example, the response strategy may set a first resource, a second resource, third resource, etc., such that the measure of the first resource is the first to be executed in response to the demand event, the measure of the second resource is the second to be executed, etc.

In some examples, this order is used to select the resources 300 for the given demand event. The resources are selected pursuant to this order until the estimated power level is sufficiently low to satisfy the demand event. In some examples, the order is used to organize the resources and the times during the demand event at which the measures for the resources are called to execute. For example, the measures for the selected resources may be called to executed in the given progressive order until the power reduction at the facility is sufficiently low to satisfy the demand event.

In the example depicted in FIG. 3A the resources 300 are also organized to release the measures of the various resources during the demand event. In these examples, the resources are released in the same progressive order that they are executed. This includes releasing the measure for the first resource once the power level has been sufficiently reduced at the load facility. If the power level at the facility is further lowered during the demand event, the response strategy would then release the measure for the second resource. In these examples, the order for measure release may continue in the same progressive order. One advantage of this strategy is that it may even out the time the various measures are executed. For example, the measure of the first resource is the first to be executed, but it is also the first to be released.

FIG. 3B shows another example for organizing the resources (300A, 300B, and 300C) in the response strategy. In this example, the response strategy also sets a first resource, a second resource, a third resource, etc., and this order defines the order in which the measures of these resources are executed. Similar to the above example, this order may be used to select the resources for a given event in some examples. And in some examples, the order may be used to organize the resources and the times during the demand event at which the measures for the resources are called to execute.

In the example in FIG. 3B, the response strategy sets the order for releasing the measures of the various resources 300 to be the inverse order. Thus, in this example, if the measures for the first resource, second resource, and third resource have all been executed, once the power level has sufficiently lowered the measure for the third resource resource would be released first. If the power level were lowered further then the measure for the second resource would be release, and so forth. This response strategy may be referred to as the inverse order, because the order for releasing the measures is the inverse from the order in which the measures are executed.

Figure 3C:
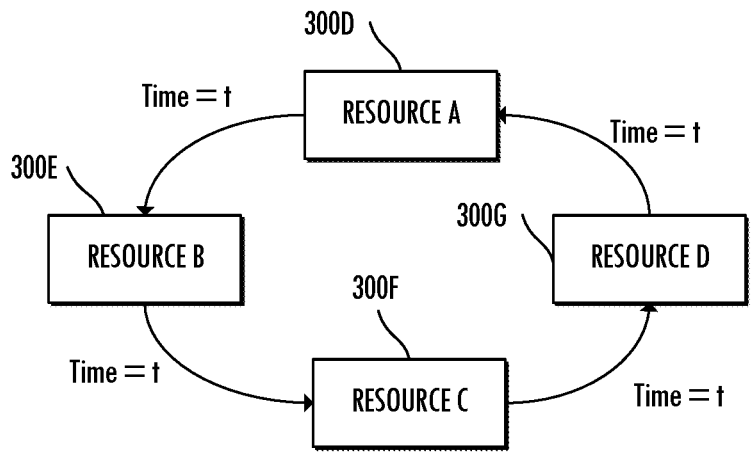
FIG. 3C illustrates a rotation for executing the measure of various resources and releasing these measures, according to some example implementations.
Figure 3D:
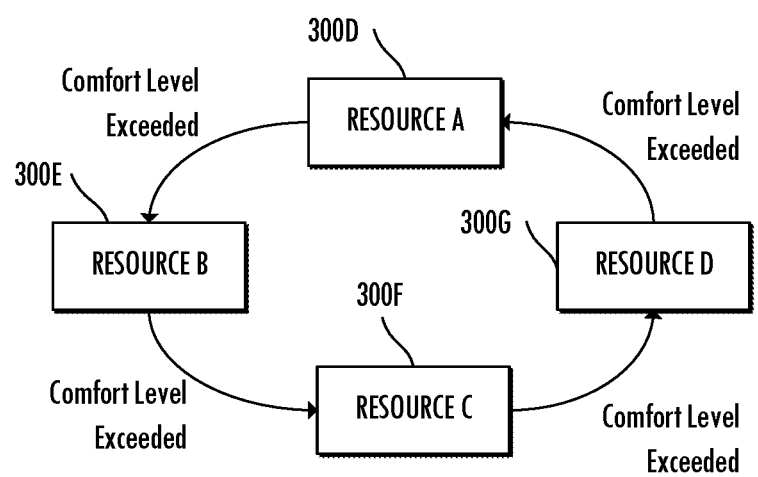
FIG. 3D illustrates a rotation for executing the measure of various resources and releasing these measures, according to some example implementations.
Figure 3E:
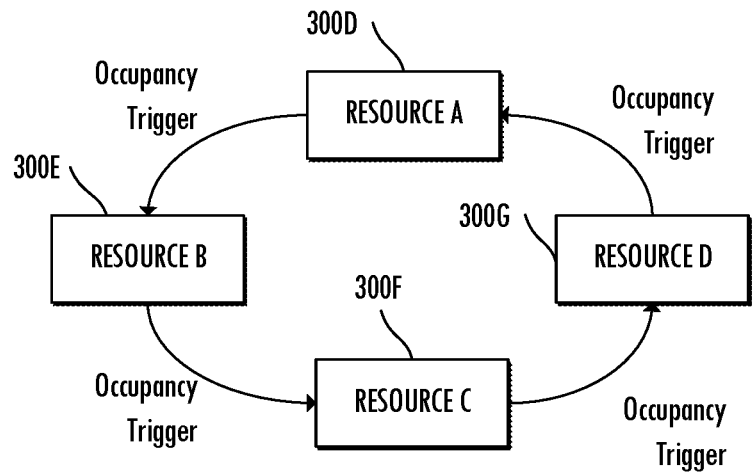
FIG. 3E illustrates a rotation for executing the measure of various resources and releasing these measures, according to some example implementations.

In some examples, the response strategy may execute measures for various resources during the demand event to allow the release of a measure for a separate resource during the demand event. In this way, one or more measures will not need to be executed during the entire demand event. In some examples, the measures are executed and released according to an order, for example, one or more of the orders described herein. In some examples, the execution and release of the measures for the various resources may be rotated. FIGS. 3C-E show example diagrams for how the resources (300D, 300E, 300F, and 300G) may be rotated during a demand event.

FIG. 3C shows an example diagram where the resources 300 are rotated based on time. In this example, the measure for the first resource may be executed to respond to the demand event. After a given time the measure of a second resource may be executed to respond to the demand event, and the measure for the first resource may be released. This process may continue for the duration of the demand event. In these examples, the response strategy rotates through the selected resources to more evenly distribute the effects of response strategy across different parts of the load facility.

In one example, the method for initiating resource rotation is based strictly on time. In these examples, the apparatus, which may be SCU 202, has executed the measure on less than all of the selected resources, and as a result, a rotation between the resources may be appropriate. In these examples, the response strategy may initiate a rotation of the selected resources where the execution of a measure for a given resource is initiated after the release of execution for the measure of a different resource. To use FIG. 3C as an example, the measure for the first resource 300D may be released only after the measure for the second resource 300E is executed. In this example, the process for executing the measure for the second resource, which allows for the release of the measure for the first resource, may be initiated after a given time period has elapsed. This process may continue for the various resources during the demand event, and in some examples, it may cycle through the rotation more than once.

In some examples, a maximum duration may be set before the rotation process is initiated by the rotation strategy. In some examples, the maximum duration is set by the user. In some examples, when the maximum duration has expired, the next available resource, which may be set according to the rotation order and/or priority, may be initiated such that the measure for that resource is executed.

In some examples, the rotation strategy may include restrictions that only allow the rotation to occur if the next resource in the rotation order has an estimated reduction comparable to the present resource. If the power reductions for each of the resources is similar and/or the next resource in the rotation order has a greater estimated power reduction level, then the response strategy may initiate the rotation of the resources. In some examples, if the resource in the rotation order is not comparable in terms of power reduction and/or has a lower estimated power reduction level, the response strategy may move to the next resource in the rotation order to determine whether that resource has an estimated power reduction level that is comparable or greater than the power reduction level of the resource, whose measure is being executed. This process may continue until a selected resource is identified, whose measure is not currently being executed and that has an estimated power level reduction comparable or greater than the power level of a selected resource, whose measure has been executed for the maximum duration. Once the selected resource is identified, the response strategy may execute the rotation of resources. In some examples, the rotation strategy also includes a minimum duration before each rotation. The minimum duration may be set to avoid excessive rotations and/or allow the effects of the rotation to stabilize.

FIG. 3D shows an example diagram where the resources 300 are rotated based on comfort. In this example, the measure for the first resource may be executed to respond to the demand event and the demand event may rotate between resources based on comfort considerations. In these examples, the response strategy may rotate the measure being called when the comfort conditions of a space associated with the presently-executed resource exceeds a given condition. In some examples, this condition may be a user-defined condition.

To walk through an example, the comfort consideration may be the temperature of a given space. For example, assume a response strategy includes four resources, where each resource includes a measure for controlling a group of heating, ventilation, and air conditioning (HVAC) terminal units providing conditioned air to four different parts of an occupied building. In this example, the estimated reduction for each group is roughly equivalent, and the required load reduction for the demand event can be accomplished by executing the measure for any of the four resources. Instead of executing the measure for a single resource and affecting a given space for the duration of the event, in this example, the response strategy may rotate the execution of the resources once the comfort conditions of an affected space exceed a given limit. In some examples a user may define these limits.

As a further example, if the temperature of a space effected by the execution of a measure rises above 78° F., then the response strategy may force a rotation of the various resources. In some examples, the response strategy executes the measure of a separate resource based on the resource that is considered the most comfortable, e.g., the resources associated with a space whose measure temperature is the closest to the temperature setpoint. In other examples, other measures are executed based on other factors. Once the response strategy reduces the load by executing the measure for a separate resource, the previously executed measure may then be released. The response strategy may repeat this process anytime a space effected by the execution of a measure becomes uncomfortable, which may be determined based on the various setting.

The response strategy may use different indicators of comfort for a space, and in some examples, these indicators depend on user preference. Depending on the number of sensors and devices controlling comfort, the response strategies may vary. Four possibilities are determining comfort based on temperature include setting a minimum or maximum space temperature (depending on the season), a minimum or maximum average space temperature (when multiple sensors/devices exist), determining a maximum deviation of the temperature from a setpoint, or determining an average deviation of the temperature from a setpoint.

In some examples, a temperature for a single space associated with a resource may be used to measure the condition for the space or spaces associated with the resource. In these examples, the comfort of that space may be compared to the temperature of the spaces associated with the other resources by evaluating the maximum space temperature (summer months) or minimum space temperature (winter months) of the spaces associated with the other selected resources. The space with the highest temperature in the summer may be considered the least comfortable. Similarly, the space with the lowest space temperature in the winter months may be considered the least comfortable.

In some examples, the temperature from multiple space temperature sensors may be used to measure the conditions of the spaces associated with a resource. In these examples, the comfort for the spaces associated with a given resource may be evaluated by taking the average of the space temperatures measured by the sensors associated with that resource. The comfort is then determined by comparing these averages, the maximum average space temperature (summer months) or minimum average space temperature (winter months). The resource with the highest average temperature for the associated spaces in the summer shall be considered the least comfortable. Similarly, the resource with the lowest average space temperature for the associated spaces in the winter months shall be considered the least comfortable. In some examples, the user may select between setting the rotation parameter to be based on temperature for a space or average temperature for the spaces.

In some examples, the deviation of a space is defined as the difference between the space temperature and active setpoint. In these examples, cooling (typically summer months), the deviation may be determined by subtracting the active setpoint from the space temperature. For example, assume the space temperature is 76° F. and the active (cooling) setpoint is 74° F. The deviation under those conditions is +2° F. In heating in some examples, the deviation may be calculated by subtracting the space temperature from the active (heating) setpoint. For example, assume the space temperature is 68° F. and the active (heating) setpoint is 70° F. The deviation under those conditions is +2° F. The response strategy may rotate the resources based on the resource associated with the space (or group of spaces) with the maximum deviation shall be considered the least comfortable. In examples, where there are groups of spaces, temperature sensors, and/or setpoints, the average temperature deviation may be used.

FIG. 3E shows an example diagram where the resources 300 are rotated based on occupancy. In these examples, the response strategy may select a resource, execute a measure, and/or rotate between executed measures for various selected resources based on the number of people that may be impacted. In some examples, the apparatus may include a predicted schedule or estimation for occupancy. In some examples, the apparatus monitors occupancy based on various sensors or other inputs. In some of these examples, the apparatus may make a binary determination regarding the occupancy, e.g., occupied or unoccupied. In other examples, a more discerning occupancy determination may be made, potentially a count for the number of people or people density, or an indication of the number or density of people. In these examples, the response strategy may prioritize the resources for responding to the demand event based on the occupancy information. For example, the response strategy may prioritize selecting resources that impact unoccupied spaces, or spaces with limited occupancy or occupancy density.

In some examples, the response strategy may select resources for the response strategy based on occupancy information. In some examples, the response strategy may rotate the measures being executed based on the occupancy information. In these examples, the response strategy may execute a given measure for a resource that is associated with an unoccupied space. In some examples, the response strategy may rotate the measure being executed once an indication is received that the space has become occupied. In some examples, the response strategy may rotate the measure being executed once an indication is received that a previously occupied space is no longer occupied. For example, if the measure for a given resource is not being executed during a demand event becomes associated with an unoccupied space(s), the response strategy executes the measure associated with that space, and release the measure associated with a separate space, potentially one that is occupied.

The various response strategies discussed above are example approaches. These example approaches may be used independently or combined to establish a response strategy for a demand event as well as address any other concerns. Moreover, a user may select and/or customize the resources based on one or more of the techniques discussed.

In some examples, the resources may be selected to respond to a given demand event from the plurality of resources in various ways. For example, each resource can be individually enabled/disabled for participation in a given demand event. SCU 202 may determine which resources are enabled for participation in the event based on which resources are selected. In some examples, the resources may be selected based on user input. This may include a user selecting each resource for participation in a given demand event or providing input in another form.

In some examples, the resources may be selected individually. In other examples, the resources may be selected as part of a group or class of resources. For example, users may prefer to selected resources based on one or more variables. In these examples, the user may select resources that include one or more variables, and the selected resources may be chosen based on whether they include these given variables.

In some examples, the resources are selected based on one or more of a weather season, an environmental condition, a building use, an occupancy density, or a user preference.

For example, resources may be selected based on weather seasons in various ways, some of which are discussed above. In some examples, the heating operation of a given building may be critical during the winter months, but not the summer. In these examples, resources that impact the heating operation of the building may only be selected during the summer months to have a minimum impact. In other examples, the heating resources may be selected during the winter months, because these resources may be the most effective at reducing load. In some of these examples, the heating resources selected during the winter months may be defined such that heating to the building is not reduced below a critical level during winter.

Environmental conditions may also be used to selected resources. For example, on a day with abundant daylight, identification of the perimeter lighting in the facility may be preferred for an event. In these examples, the perimeter lighting resource may be selected. In contrast, on a cloudy day, it may be preferable not to selected any resources that relate to any lighting control action or other options with less risk of disrupting user productivity. The response strategy may be used to provide this level of flexibility and sophistication to maximize savings while minimizing disruption to the occupants and/or processes of a facility.

Resources may also be selected for the building use cases. For example, a load facility may operate on a given schedule or pattern, which may impact the resources that are selected. For example, in a manufacturing facility the busiest time may be during the last week of the month. In this example, resources less tied to productivity in manufacturing may be selected during those times.

Similarly, resources may be selected based on occupant density. As discussed above, certain parts of the load facility may be more populous than another area in the same building. This may be determined based on sensed conditions, schedules, or potentially other methods. Regardless, in any of these examples, the selection of resource availability may be determined to minimize the impact to as many occupants as possible.

Again, a user may select the available resources based on the techniques described above. In addition, the user and/or the system may continuously update the criterion for selecting resources based on input from the system. This may include updating based on feedback from prior demand response events, monitored events, and/or user input, which may be based on complaints or comments from occupants.

The response strategy may also organize the resources in various ways as discussed above. To walk through further examples, this may include organizing the resources based on various inputs. These inputs may be used to determine a priority in which the response strategy executes the measures for the various selected resources. These inputs may be used to determine the order in which the measures for the selected resources may be called, which may (or may not) be based on their priority. These inputs may be used to rotate the execution for the measures of the selected resource, and/or the release of these measures.

For example, the resources may be organized based on one or more of a weather season, an environmental condition, a building use, an occupancy density, or a user preference. In some examples, the response strategy may organizes the resources based on weather in a similar manner to the process discussed above regarding selecting the resources. In these examples, the resources may be prioritized based on the weather season, which may result in the measures for the resources being called in a given order. For example, during the winter months resources directed to cooling may be given higher priority. In these examples, the selected resources may be ordered such that resources impacting cooling, e.g., chiller cooling operation, cooling towers, may executed first in an attempt to satisfy the demand event while minimizing the impact on comfort. In other examples, the response strategy may be established to include various measures for execution during the winter resources that are critical to winter operation. For example, the response strategy may include a setting that no conditioning space may reach a temperature below a certain limit, e.g., 65° F., during the winter months. If the SCU 202 receives an indication that a conditioned space is below that limit or approaching that limit the response strategy may adjust the measures being executed during the demand event to avoid that issue. In this example, the response strategy may prioritize a different resource during the summer that no conditioning space may reach a temperature below a certain limit, e.g., 60° F., because the heating operation is less critical during that season.

In some examples, the response strategy may organize the resources based on environmental conditions. This may include the above example where exterior lighting resources were prioritized based on the availability of sunlight. In these examples, the response strategy may execute the measures for these resources initially. In some of these examples, various resources are included that dim these lights at different levels, and the response strategy may prioritize the these different resources based on the available sunlight. In some examples, the response strategy may initiate the release of a given measure if the environmental conditions change. For example, if the sun sets or the day becomes cloudy, the system may release the measure associated with the exterior lighting and execute other selected resources.

Similarly, the response strategy may use occupancy and/or occupancy density to organize the resources. As discussed above, in some examples, the response strategy prioritizes the execution of measures directed to vacant or less occupied spaces to minimize the impact of the response strategy. In some examples, the occupancy and/or occupancy density may be used to order the timing the measures for the resources are executed. In some examples, occupancy is used to rotate between the execution of various selected measures. Occupancy can also be used to release measures for selected resources and/or adjust the duration a measure of selected resource is executed.

In some examples, the user provides preferences regarding the organization of the resources within the response strategy. This may include selecting from one or more of the criterion discussed herein.

In some examples, the resources are organized based on measurements from a sensor. In these examples, the measurements may indicate an occupancy level, a humidity condition, an amount of a volatile organic compound, or potentially another indicator. The measurements may be used to prioritize and/or organize the resources within the response strategy.

In some examples, a sensor is used to provide information that may be used by the response strategy. This sensor may be a temperature sensor, and in some examples, the temperature sensor provides information regarding a conditioned space associated with one or more resources. In some examples, multiple temperature sensors are used, which may be associated with different conditioned spaces. As discussed above, these temperature sensors may be used to organize the resources within the response strategy. Again, this may include rotating the resources during a demand event based on a minimum or maximum space temperature (depending on the season), a minimum or maximum average space temperature (when multiple sensors/devices exist), determining a maximum deviation of the temperature from a set point, or determining an average deviation of the temperature from a set point.

In some examples, the sensor may provide an indication of occupancy level. These sensors may include $CO_2$ sensors, or other sensors that provide an indication of occupancy. As discussed above, in some examples, the response strategy prioritizes the execution of measures directed to unoccupied or less occupied spaces to minimize the impact of the response strategy.

In some examples, the sensor may provide an indication of the humidity level of a space. This sensor may be a humidity sensor, and in some examples, the humidity sensor provides information regarding a conditioned space associated with one or more resources. In some examples, multiple humidity sensors are used, which may be associated with different conditioned spaces. In some examples, the humidity sensor provides an indication of comfort, and the response strategy may organize the resources based on humidity level in the same manner discussed herein in connection with temperature. In some examples, certain spaces within the facility may be particularly sensitive to humidity, e.g., server rooms, indoor agriculture, etc. In these examples, the resources may prioritize resources with lower sensitivity to changes in humidity levels. For example, resources that impact the humidity of spaces with tight humidity tolerances may only be called if necessary to respond to the demand event. And in some examples, in the event of those circumstances, the given resource may only be called for a limited period of time.

In some examples, the sensor may provide an indication of the level of volatile organic compounds (VOCs) within a space. The response strategy may organize the resources based on this indication, and in some examples, this organization is based on comparing the measured VOCs to a limit for a given space. This limit may be fixed or variable. In these examples, the response strategy may organize the resources based on the comparisons in one of the manners discussed above.

In some examples, the sensor may provide an indication of the sound level of a given space. The response strategy may organize the resources based on this indication, and in some examples, this organization is based on comparing the measured sound level to a limit for given space. This limit may be fixed or variable. In these examples, the response strategy may organize the resources based on this comparison in one of the manners discussed above.

As discussed above, the response strategy may be based, at least in part, on user input. This includes the user selecting any of the above process as well as customizing the response strategy. In examples, where the response strategy is based on a measurement, and in these examples, the user may select that the response strategy take a given action if the measured value does not comport with a desired setpoint or range. The user may further select whether the response strategy takes this action immediately or after a delay period.

In some examples, the response strategy may specify the times at which the measures for the various selected resources are called to execute during the demand event. This may include specifying an arrangement of the resources, and in these examples, the arrangement may indicate an order in which the resources are called to execute the one or more measures.

In some examples, the order indicated by the arrangement of the resources specifies a first of the resources is called before a second of the resources is called. In some of these examples, the resources may be arranged in a predefined order. This may include the order for executing the measures for the various resources, and in some examples, it may also include the order for releasing the various measures.

In some examples, the times specified by the response strategy indicate durations for which the one or more measures are executed by respective ones of the resources, and the durations may indicate a reverse order in which the respective ones of the resources cease to execute the one or more measures. In some of these examples, the resources may be arranged in a first in/first out order, such that the arrangement of the release of the measures for the selected resource is the opposite of the arrangement in which the resources are called to execute.

In some examples, the order indicated by the arrangement of the resources is periodic in that the resources are repeatedly called over the duration of the demand event. In these examples, the resources may be rotated during the demand event, and the rotation may be based on any of the methods described herein.

In some examples, the times are specified and the resources thereby organized based on one or more of a weather season, an environmental condition, a building use, an occupancy density, or a user preference. In some examples, the times are specified and the resources thereby organized based on measurements from a sensor, and the measurements indicate an occupancy level, a humidity condition, or an amount of a volatile organic compound.

In these examples, the response strategy organizes the times in which the resources are executed based on one or more of these factors. For example, the response strategy may use one or more of these factors, e.g., weather season, and prioritize the selected resources based on this factor using any of the methods described above. Based on this prioritization, the response strategy may organize the times for executing the measures for the selected resources based on this priority, e.g., low priority executed first, etc. In some examples, the response strategy may organize the times for executing these measures in a rotation and this rotation may be based on these factors and/or how these factors prioritize the resources.

In some examples, the demand event is a first demand event, and the response strategy is a first response strategy that is established for the first demand event. In some of these examples, the apparatus, which may be the SCU 202, may be further configured to establish a second response strategy for a second demand event, the arrangement of the resources indicated by the times specified by the second response strategy indicating a different order in which the resources are called to execute the one or more measures. And the SCU may be configured to execute the second response strategy to reduce the demand on the power grid from the load facility during the second demand event.

In these examples, the apparatus, which may be the SCU 202, may include two or more response strategies. In these examples, the SCU may determine which response strategy to establish based on various factors. For example, a given response strategy may be established based on the type of demand event, e.g., the power reduction requested, the time period, etc. In other examples, a given response strategy may be established based on any of the criterion discussed above.

In some examples, the plurality of resources that are defined include a parent resource with multiple other resources that are child resources of the parent resource. In these examples, the resources that are selected may be the parent resource.

In some examples, the apparatus, which may be the SCU 202, may be configured to select the child resources from the plurality of resources. In these examples, the SCU may be configured to organize the child resources within the parent resource. This may include organizing the child resources in an arrangement of the child resources, and the arrangement may indicate an order in which the child resources are called when the parent resource is called.

In these examples, organizing the resources in a parent/child relationship may provide additional flexibility. The prior example is referenced to illustrate the parent/child relationship, and again assume a building includes the following resources:

| Resource #1 | Dim Hallway Lights | 8 kW |
| Resource #2 | Demand Limit Chiller | 15 kW |
| Resource #3 | Disable Terminal Electric Heat | 40 kW |

Figure 3F:
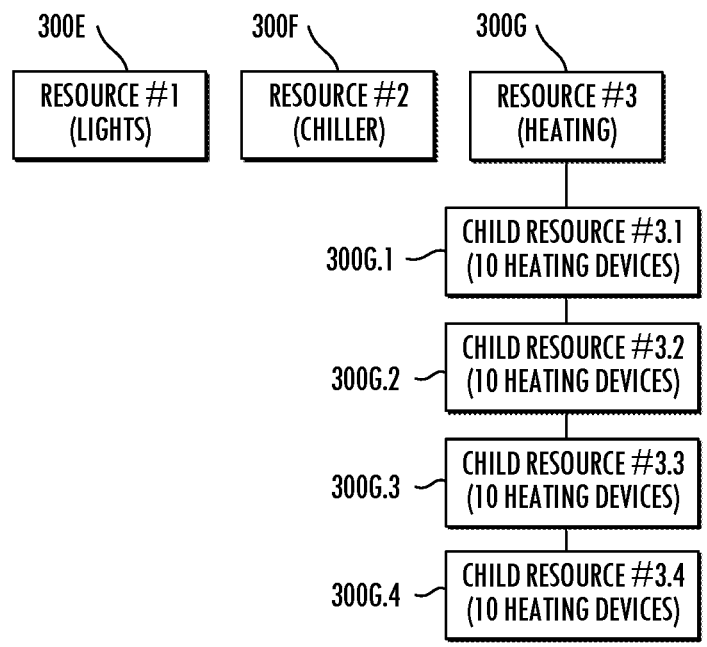
FIG. 3F illustrates an organization of resources as parent and child resources, according to some example implementations.

However, unlike that previous example, assume the third resource is a collection of similar groups—child resources. Instead of one large group of 40 devices, the third resource is instead subdivided into four child resources, each child resource's group consisting of 10 heating unit devices, each child resource (10 devices) associated with the parent resource (terminal electric heating units). FIG. 3F provides an illustration of resources (300E, 300F, and 300G) organized in this manner.

By defining the third group as a parent/child relationship, the response strategy may utilize a hybrid of various methods. For example, assume executing the measure for the third resource is necessary to maintain the building demand below the demand limit. Based on the established priority, the response strategy first executes the measure of the first resource, dimming the lights in the hallway. Assuming the building demand continues to increase, the response strategy next executes the measure of the second resource, demand limiting the chiller. Lastly, when load reduction is necessary, the response strategy executes the measure of the third resource. Since the third resource includes four child resources, the response strategy is able to execute the measures for the child resource in a rotation for only the number of child resources necessary to reduce the building demand required by the demand event. This may allow the response strategy to further respond to the demand event while minimizing the potential comfort effects associated with the curtailment. Further, comfort and other factors may be considered in such a rotation, forcing execution and release of measures as between child resources, for example, while resources continue to be managed strictly in accordance with their measures.

The response strategy may organize the child resources in any of the manners discussed above. For example, the response strategy may arrange the child resources in an order that specifies a first of the child resources is called before a second of the child resources is called. In some examples, the order indicated by the arrangement of the child resources is periodic in that the child resources are repeatedly called over the duration of the parent resource. This may include rotating which measure are called for the various child resources. The child resources may be rotated by the any of the methods described above.

In some examples, the apparatus, which may be the SCU 202, may be configured to activate a user forced rotation strategy. In these examples, activating the user forced rotation strategy by user input may cause a deviation from executing the response strategy. In these examples, the deviation may result in a call executing the one or more measures of a given resource to cease and another call to execute the one or more measures of a different resource to be initiated.

For examples, the above describes various methods for organizing the resources within a response strategy. In some examples, the user may have the ability to force rotation when applicable and possible. Some of the prior examples described define an approach for organizing the resources, and some examples describe rotating the execution of the measures for the various resources. In some examples, when a rotation is possible, the user may be permitted to manually force rotation as opposed to waiting until the given rotation strategy deems a rotation is appropriate. These examples may provide users the ability to immediately affect the resource behavior, presumably based on occupant comfort, but regardless of the parameters defined in the response strategy. In some examples, the response strategy may include limits to prevent the user from intentionally or inadvertently forcing rotation at an unreasonable or unsafe rate. In some examples, this limit is applied to protect equipment and minimize any disturbance to the facility's occupants.

In some examples, the demand event has a specified decrease in the demand on the power grid for the load facility. In some of these examples, the apparatus, which may be the SCU 202, may be configured to determine an anticipated aggregate decrease in the demand on the power grid from the response strategy, and that the anticipated aggregate decrease is less than the specified decrease. And in response, the computer is configured to notify the user.

FIGS. 4A-4E are flowcharts illustrating various steps in a method 400 of controlling demand on a power grid from a load facility in response to a demand event the load facility including electrical devices that are powered from power drawn from the power grid, according to various example implementations of the present disclosure. The method includes defining a plurality of resources of the load facility based on user input, each resource including one or more of the electrical devices and one or more measures to reduce power consumption of the one or more of the electrical devices to decrease demand on the power grid, as shown at block 402 of FIG. 4A. The method includes establishing a response strategy for the demand event, as shown at at block 404.

Establishing the response strategy includes selecting resources from the plurality of resources to respond to the demand event, as shown at block 406. The resources are organized into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event, as shown at block 408. And the method includes executing the response strategy to reduce demand on the power grid from the load facility during the demand event, as shown at block 410.

In some examples, the resources are selected at block 406 based on user input. In some examples, the resources are selected at block 406 based on one or more of a weather season, an environmental condition, a building use, an occupancy density, or a user preference.

In some examples, the resources are organized at block 408 based on user input. In some examples, the resources are organized at block 408 based on one or more of a weather season, an environmental condition, a building use, an occupancy density, or a user preference. In some examples, the resources are organized at block 408 based on measurements from a sensor, and the measurements indicate an occupancy level, a humidity condition, or an amount of a volatile organic compound.

In some examples, the resources are organized at block 408 such that the times specified by the response strategy indicate an arrangement of the resources, and the arrangement indicates an order in which the resources are called to execute the one or more measures. In some examples, the order indicated by the arrangement of the resources specifies a first of the resources is called before a second of the resources is called. In some examples, the order indicated by the arrangement of the resources is periodic in that the resources are repeatedly called over the duration of the demand event. In some examples, the times specified by the response strategy indicate durations for which the one or more measures are executed by respective ones of the resources, and the durations indicate a reverse order in which the respective ones of the resources cease to execute the one or more measures. In some examples, the times are specified and the resources thereby organized based on one or more of a weather season, an environmental condition, a building use, an occupancy density, or a user preference. In some examples, the times are specified and the resources thereby organized based on measurements from a sensor, and the measurements indicate an occupancy level, a humidity condition, or an amount of a volatile organic compound.

In some examples, the plurality of resources that are defined at block 402 include a parent resource with multiple other resources that are child resources of the parent resource. In some of these examples, the resources that are selected at block 406 include the parent resource.

Figure 4A:
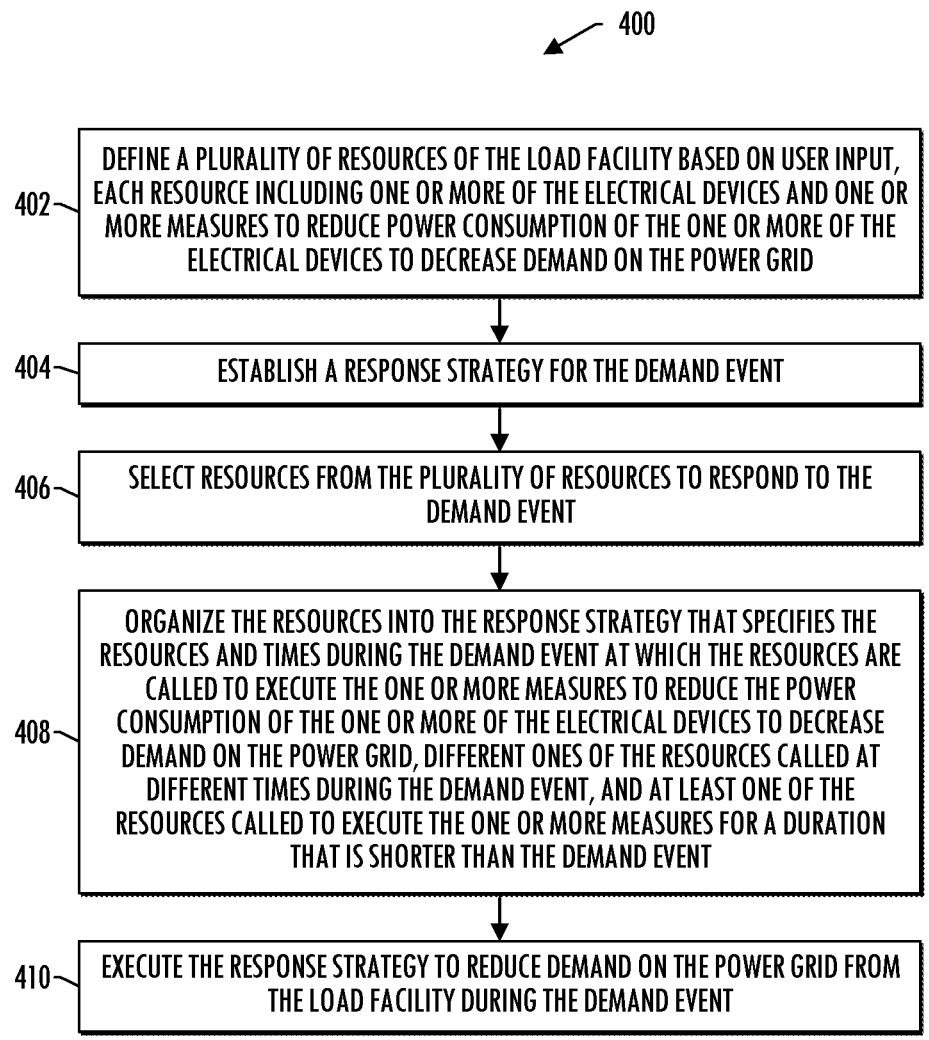
Figure 4B:
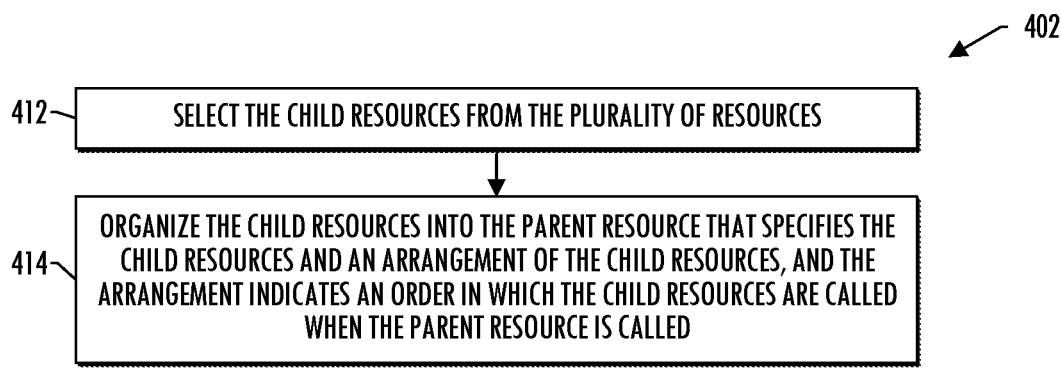
Figure 4C:
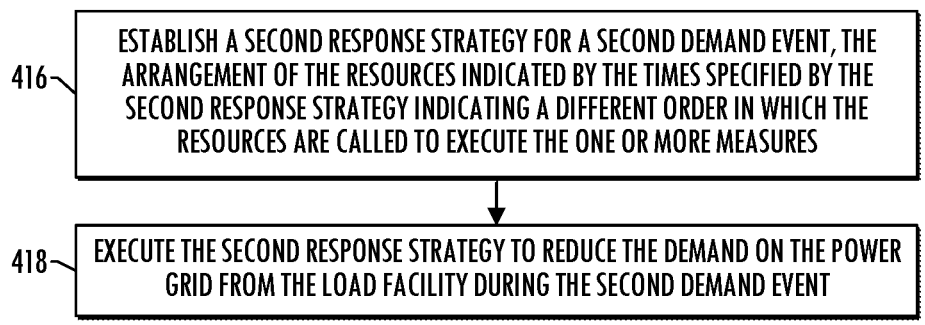

In some examples, defining the plurality of resources at block 402 includes selecting the child resources from the plurality of resources, as shown at block 412 of FIG. 4B. And defining the plurality of resources includes organizing the child resources into the parent resource that specifies the child resources and an arrangement of the child resources, and the arrangement indicates an order in which the child resources are called when the parent resource is called, as shown at block 414. In some examples, the order indicated by the arrangement of the child resources specifies a first of the child resources is called before a second of the child resources is called. In some examples, the order indicated by the arrangement of the child resources is periodic in that the child resources are repeatedly called over the duration of the parent resource.

In some examples, the demand event is a first demand event, and the response strategy is a first response strategy that is established at block 404 for the first demand event. The method 400 further includes establishing a second response strategy for a second demand event, the arrangement of the resources indicated by the times specified by the second response strategy indicating a different order in which the resources are called to execute the one or more measures, as shown at block 416 of FIG. 4C. And the method includes executing the second response strategy to reduce the demand on the power grid from the load facility during the second demand event, as shown at block 418.

In some examples, the method 400 further includes activating a user forced rotation strategy, the user forced rotation strategy being activated by user input and when activated causing a deviation from executing the response strategy, the deviation resulting in a call executing the one or more measures of a given resource to cease and another call to execute the one or more measures of a different resource to be initiated, as shown at block 420 of FIG. 4D.

In some examples, the demand event has a specified decrease in the demand on the power grid for the load facility. The method further includes determining an anticipated aggregate decrease in the demand on the power grid from the response strategy, and that the anticipated aggregate decrease is less than the specified decrease, as shown at block 422 of FIG. 4E. And in response, the user is notified, as shown at block 424.

According to example implementations of the present disclosure, components of the ICS 114 including the SCU 202, the field connection units 204 including the PLCs 210 and RTUs 212, and the terminal 214 may be implemented by various means. Means for implementing these components may include hardware, alone or under direction of one or more computer programs from a computer-readable storage medium. In some examples, one or more apparatuses may be configured to function as or otherwise implement one or more of the components shown and described herein. In examples involving more than one apparatus, the respective apparatuses may be connected to or otherwise in communication with one another in a number of different manners, such as directly or indirectly via a wired or wireless network or the like.

Figure 5:
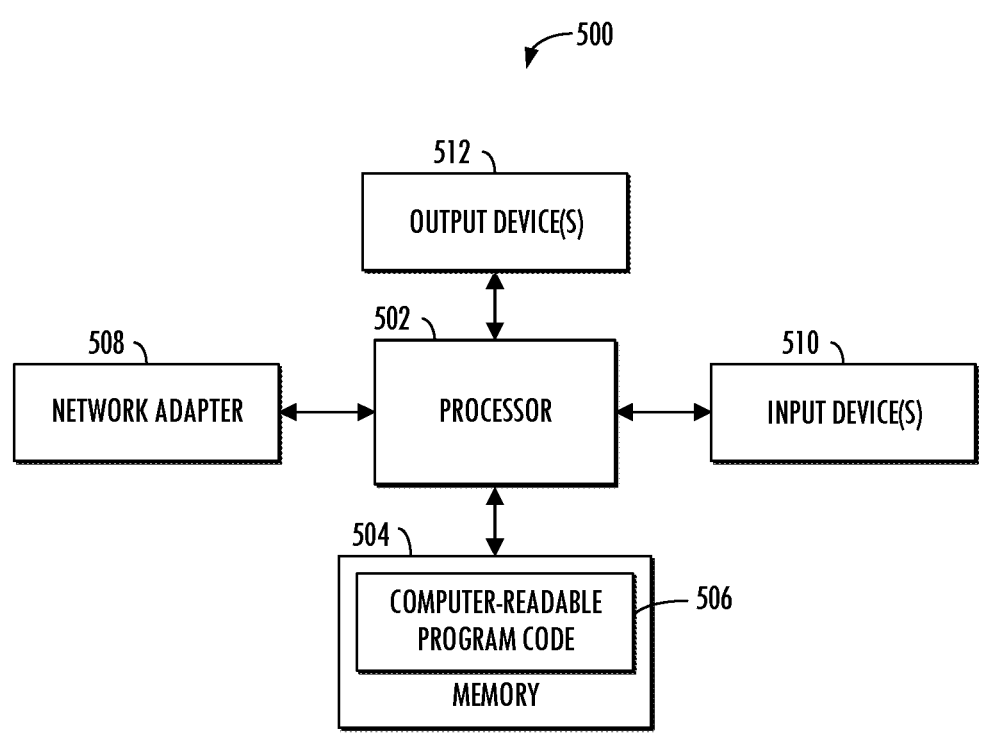
FIG. 5 illustrates an apparatus according to some example implementations.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer, PLC, circuit board or the like. The apparatus may include one or more of each of a number of components such as, for example, a processor 502 connected to a memory 504.

The processor 502 is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor may be a number of processors, a multi-core processor or some other type of processor, depending on the particular implementation.

The processor 502 may be configured to execute computer programs such as computer-readable program code 506, which may be stored onboard the processor or otherwise stored in the memory 504. In some examples, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 504 is generally any piece of computer hardware capable of storing information such as, for example, data, computer-readable program code 506 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 502, causes the apparatus 500 to perform various operations as described herein, some of which may in turn cause the electrical equipment 112 to perform various operations.

In addition to the memory 504, the processor 502 may also be connected to one or more peripherals such as a network adapter 508, one or more input/output (I/O) devices or the like. The network adapter is a hardware component configured to connect the apparatus 500 to one or more networks to enable the apparatus to transmit and/or receive information via the one or more networks. This may include transmission and/or reception of information via one or more networks through a wired or wireless connection using Wi-Fi, Bluetooth, BACnet, LonTalk, Modbus, ZigBee, Zwave, or the like, or other suitable wired or wireless communication protocols.

The I/O devices may include one or more input devices 510 capable of receiving data or instructions for the apparatus 500, and/or one or more output devices 512 capable of providing an output from the apparatus. Examples of suitable input devices include a keyboard, keypad or the like, and examples of suitable output devices include a display device such as a one or more light-emitting diodes (LEDs), a LED display, a liquid crystal display (LCD), or the like.

As explained above and reiterated below, the present disclosure includes, without limitation, the following example implementations.

Clause 1. An apparatus for controlling demand on a power grid from a load facility in response to a demand event, the load facility including electrical devices that are powered from power drawn from the power grid, the apparatus comprising: a memory configured to store computer-readable program code; and a processor configured to access the memory, and execute the computer-readable program code to cause the apparatus to at least: define a plurality of resources of the load facility based on user input, each resource including one or more of the electrical devices and one or more measures to reduce power consumption of the one or more of the electrical devices to decrease demand on the power grid; establish a response strategy for the demand event, including: select resources from the plurality of resources to respond to the demand event; and organize the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and execute the response strategy to reduce demand on the power grid from the load facility during the demand event.

Clause 2, The apparatus of clause 1, wherein the resources are selected based on user input.

Clause 3. The apparatus of clause 1 or clause 2, wherein the resources are selected based on one or more of a weather season; an environmental condition, a building use, an occupancy density, or a user preference.

Clause 4. The apparatus of any of clauses 1 to 3; wherein the resources are organized based on user input.

Clause 5. The apparatus of any of clauses 1 to 4, wherein the resources are organized based on one or more of a weather season, an environmental condition, a building use, an occupancy density, or a user preference.

Clause 6. The apparatus of any of clauses 1 to 5, wherein the resources are organized based on measurements from a sensor, and the measurements indicate an occupancy level, a humidity condition, or an amount of a volatile organic compound.

Clause 7. The apparatus of any of clauses 1 to 6, wherein the plurality of resources that are defined include a parent resource with multiple other resources that are child resources of the parent resource, and wherein the resources that are selected include the parent resource.

Clause 8. The apparatus of clause 7, wherein the apparatus caused to define the plurality of resources includes the apparatus caused to: select the child resources from the plurality of resources; and organize the child resources into the parent resource that specifies the child resources and an arrangement of the child resources, and the arrangement indicates an order in which the child resources are called when the parent resource is called.

Clause 9. The apparatus of clause 8, wherein the order indicated by the arrangement of the child resources specifies a first of the child resources is called before a second of the child resources is called.

Clause 10. The apparatus of clause 8 or clause 9, wherein the order indicated by the arrangement of the child resources is periodic in that the child resources are repeatedly called over the duration of the parent resource.

Clause 11. The apparatus of any of clauses 1 to 10, wherein the times specified by the response strategy indicate an arrangement of the resources, and the arrangement indicates an order in which the resources are called to execute the one or more measures.

Clause 12. The apparatus of clause 11, wherein the order indicated by the arrangement of the resources specifies a first of the resources is called before a second of the resources is called.

Clause 13. The apparatus of clause 11 or clause 12, wherein the order indicated by the arrangement of the resources is periodic in that the resources are repeatedly called over the duration of the demand event.

Clause 14. The apparatus of any of clauses 11 to 13, wherein the times specified by the response strategy indicate durations for which the one or more measures are executed by respective ones of the resources, and the durations indicate a reverse order in which the respective ones of the resources cease to execute the one or more measures.

Clause 15. The apparatus of any of clauses 11 to 14, wherein the times are specified and the resources thereby organized based on one or more of a weather season, an environmental condition, a building use, an occupancy density, or a user preference.

Clause 16. The apparatus of any of clauses 11 to 15, wherein the times are specified and the resources thereby organized based on measurements from a sensor, and the measurements indicate an occupancy level, a humidity condition, or an amount of a volatile organic compound.

Clause 17. The apparatus of any of clauses 11 to 16, wherein the demand event is a first demand event, and the response strategy is a first response strategy that is established for the first demand event, and the processor is configured to execute the computer-readable program code to cause the apparatus to further at least: establish a second response strategy for a second demand event, the arrangement of the resources indicated by the times specified by the second response strategy indicating a different order in which the resources are called to execute the one or more measures: and execute the second response strategy to reduce the demand on the power grid from the load facility during the second demand event.

Clause 18. The apparatus of any of clauses 1 to 17, further in which the apparatus is caused to activate a user forced rotation strategy, the user forced rotation strategy being activated by user input and when activated causing a deviation from executing the response strategy, the deviation resulting in a call executing the one or more measures of a given resource to cease and another call to execute the one or more measures of a different resource to be initiated.

Clause 19. The apparatus of any of clauses 1 to 18, wherein the demand event has a specified decrease in the demand on the power grid for the load facility, and the processor is configured to execute the computer-readable program code to cause the apparatus to further at least: determine an anticipated aggregate decrease in the demand on the power grid from the response strategy, and that the anticipated aggregate decrease is less than the specified decrease; and in response, notify the user.

Clause 20. A method of controlling demand on a power grid from a load facility in response to a demand event, the load facility including electrical devices that are powered from power drawn from the power grid, the method comprising: defining a plurality of resources of the load facility based on user input, each resource including one or more of the electrical devices and one or more measures to reduce power consumption of the one or more of the electrical devices to decrease demand on the power grid; establishing a response strategy for the demand event, including: selecting resources from the plurality of resources to respond to the demand event; and organizing the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and executing the response strategy to reduce demand on the power grid from the load facility during the demand event.

Clause 21. The method of clause 20, wherein the resources are selected based on user input.

Clause 22. The method of clause 20 or clause 21, wherein the resources are selected based on one or more of a weather season, an environmental condition, a building use, an occupancy density, or a user preference.

Clause 23. The method of any of clauses 20 to 22, wherein the resources are organized based on user input.

Clause 24. The method of any of clauses 20 to 23, wherein the resources are organized based on one or more of a weather season, an environmental condition, a building use; an occupancy density, or a user preference.

Clause 25. The method of any of clauses 20 to 24, wherein the resources are organized based on measurements from a sensor, and the measurements indicate an occupancy level, a humidity condition, or an amount of a volatile organic compound.

Clause 26. The method of any of clauses 20 to 25, wherein the plurality of resources that are defined include a parent resource with multiple other resources that are child resources of the parent resource, and wherein the resources that are selected include the parent resource.

Clause 27. The method of clause 26, wherein defining the plurality of resources includes: selecting the child resources from the plurality of resources; and organizing the child resources into the parent resource that specifies the child resources and an arrangement of the child resources, and the arrangement indicates an order in which the child resources are called when the parent resource is called.

Clause 28. The method of clause 27, wherein the order indicated by the arrangement of the child resources specifies a first of the child resources is called before a second of the child resources is called.

Clause 29. The method of clause 27 or clause 28, wherein the order indicated by the arrangement of the child resources is periodic in that the child resources are repeatedly called over the duration of the parent resource.

Clause 30. The method of any of clauses 20 to 29, wherein the times specified by the response strategy indicate an arrangement of the resources, and the arrangement indicates an order in which the resources are called to execute the one or more measures.

Clause 31. The method of clause 30, wherein the order indicated by the arrangement of the resources specifies a first of the resources is called before a second of the resources is called.

Clause 32. The method of clause 30 or clause 31, wherein the order indicated by the arrangement of the resources is periodic in that the resources are repeatedly called over the duration of the demand event.

Clause 33. The method of any of clauses 30 to 32, wherein the times specified by the response strategy indicate durations for which the one or more measures are executed by respective ones of the resources, and the durations indicate a reverse order in which the respective ones of the resources cease to execute the one or more measures.

Clause 34. The method of any of clauses 30 to 33, wherein the times are specified and the resources thereby organized based on one or more of a weather season, an environmental condition, a building use, an occupancy density, or a user preference.

Clause 35. The method of any of clauses 30 to 34, wherein the times are specified and the resources thereby organized based on measurements from a sensor, and the measurements indicate an occupancy level, a humidity condition, or an amount of a volatile organic compound.

Clause 36. The method of any of clauses 30 to 35, wherein the demand event is a first demand event, and the response strategy is a first response strategy that is established for the first demand event, and the method further comprises: establishing a second response strategy for a second demand event, the arrangement of the resources indicated by the times specified by the second response strategy indicating a different order in which the resources are called to execute the one or more measures; and executing the second response strategy to reduce the demand on the power grid from the load facility during the second demand event.

Clause 37. The method of any of clauses 20 to 36, further comprising activating a user forced rotation strategy, the user forced rotation strategy being activated by user input and when activated causing a deviation from executing the response strategy, the deviation resulting in a call executing the one or more measures of a given resource to cease and another call to execute the one or more measures of a different resource to be initiated.

Clause 38. The method of any of clauses 20 to 37, wherein the demand event has a specified decrease in the demand on the power grid for the load facility, and the method further comprises: determining an anticipated aggregate decrease in the demand on the power grid from the response strategy, and that the anticipated aggregate decrease is less than the specified decrease; and in response, notifying the user.

Clause 39. A computer-readable storage medium for controlling demand on a power grid from a load facility in response to a demand event, the load facility including electrical devices that are powered from power drawn from the power grid, the computer-readable storage medium being non-transitory and having computer-readable program code stored therein that, in response to execution by a processor, causes an apparatus to at least: define a plurality of resources of the load facility based on user input, each resource including one or more of the electrical devices and one or more measures to reduce power consumption of the one or more of the electrical devices to decrease demand on the power grid; establish a response strategy for the demand event, including: select resources from the plurality of resources to respond to the demand event; and organize the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and execute the response strategy to reduce demand on the power grid from the load facility during the demand event.

Clause 40. The computer-readable storage medium of clause 39, wherein the resources are selected based on user input.

Clause 41. The computer-readable storage medium of clause 39 or clause 40, wherein the resources are selected based on one or more of a weather season, an environmental condition, a building use, an occupancy density, or a user preference.

Clause 42. The computer-readable storage medium of any of clauses 39 to 41, wherein the resources are organized based on user input.

Clause 43. The computer-readable storage medium of any of clauses 39 to 42, wherein the resources are organized based on one or more of a weather season, an environmental condition, a building use, an occupancy density, or a user preference.

Clause 44. The computer-readable storage medium of any of clauses 39 to 43, wherein the resources are organized based on measurements from a sensor, and the measurements indicate an occupancy level, a humidity condition, or an amount of a volatile organic compound.

Clause 45. The computer-readable storage medium of any of clauses 39 to 44, wherein the plurality of resources that are defined include a parent resource with multiple other resources that are child resources of the parent resource, and wherein the resources that are selected include the parent resource.

Clause 46. The computer-readable storage medium of clause 45, wherein the apparatus caused to define the plurality of resources includes the apparatus caused to: select the child resources from the plurality of resources; and organize the child resources into the parent resource that specifies the child resources and an arrangement of the child resources, and the arrangement indicates an order in which the child resources are called when the parent resource is called.

Clause 47. The computer-readable storage medium of clause 46, wherein the order indicated by the arrangement of the child resources specifies a first of the child resources is called before a second of the child resources is called.

Clause 48. The computer-readable storage medium of clause 46 or clause 47, wherein the order indicated by the arrangement of the child resources is periodic in that the child resources are repeatedly called over the duration of the parent resource.

Clause 49. The computer-readable storage medium of any of clauses 39 to 48, wherein the times specified by the response strategy indicate an arrangement of the resources, and the arrangement indicates an order in which the resources are called to execute the one or more measures.

Clause 50. The computer-readable storage medium of clause 49, wherein the order indicated by the arrangement of the resources specifies a first of the resources is called before a second of the resources is called.

Clause 51. The computer-readable storage medium of clause 49 or clause 50, wherein the order indicated by the arrangement of the resources is periodic in that the resources are repeatedly called over the duration of the demand event.

Clause 52. The computer-readable storage medium of any of clauses 49 to 51, wherein the times specified by the response strategy indicate durations for which the one or more measures are executed by respective ones of the resources, and the durations indicate a reverse order in which the respective ones of the resources cease to execute the one or more measures.

Clause 53. The computer-readable storage medium of any of clauses 49 to 52, wherein the times are specified and the resources thereby organized based on one or more of a weather season, an environmental condition, a building use, an occupancy density, or a user preference.

Clause 54. The computer-readable storage medium of any of clauses 49 to 53, wherein the times are specified and the resources thereby organized based on measurements from a sensor, and the measurements indicate an occupancy level, a humidity condition, or an amount of a volatile organic compound.

Clause 55. The computer-readable storage medium of any of clauses 49 to 54, wherein the demand event is a first demand event, and the response strategy is a first response strategy that is established for the first demand event, and the computer-readable storage medium has further computer-readable program code stored therein in response to execution by the processor, causes the apparatus to further at least: establish a second response strategy for a second demand event, the arrangement of the resources indicated by the times specified by the second response strategy indicating a different order in which the resources are called to execute the one or more measures: and execute the second response strategy to reduce the demand on the power grid from the load facility during the second demand event.

Clause 56. The computer-readable storage medium of any of clauses 39 to 55, further in which the apparatus is caused to activate a user forced rotation strategy, the user forced rotation strategy being activated by user input and when activated causing a deviation from executing the response strategy, the deviation resulting in a call executing the one or more measures of a given resource to cease and another call to execute the one or more measures of a different resource to be initiated.

Clause 57. The computer-readable storage medium of any of clauses 39 to 56, wherein the demand event has a specified decrease in the demand on the power grid for the load facility, and the computer-readable storage medium has further computer-readable program code stored therein that, in response to execution by the processor, causes the apparatus to further at least: determine an anticipated aggregate decrease in the demand on the power grid from the response strategy, and that the anticipated aggregate decrease is less than the specified decrease; and in response, notify the user.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for controlling demand on a power grid from a load facility in response to a demand event, the load facility including electrical devices that are powered from power drawn from the power grid, the apparatus comprising:
 a memory configured to store computer-readable program code; and
 a processor configured to access the memory, and execute the computer-readable program code to cause the apparatus to at least:
 define a plurality of resources of the load facility based on user input, each resource including one or more of the electrical devices and one or more measures to reduce power consumption of the one or more of the electrical devices to decrease demand on the power grid;
 establish a response strategy for the demand event, including:
 select resources from the plurality of resources to respond to the demand event; and
 organize the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and
 execute the response strategy to reduce demand on the power grid from the load facility during the demand event.

2. The apparatus of claim 1, wherein the resources are selected based on one or more of a weather season, an environmental condition, a building use, an occupancy density, or a user preference.

3. The apparatus of claim 1, wherein the resources are organized based on user input.

4. The apparatus of claim 1, wherein the plurality of resources that are defined include a parent resource with multiple other resources that are child resources of the parent resource, and
wherein the resources that are selected include the parent resource.

5. The apparatus of claim 4, wherein the apparatus caused to define the plurality of resources includes the apparatus caused to:
select the child resources from the plurality of resources; and
organize the child resources into the parent resource that specifies the child resources and an arrangement of the child resources, and the arrangement indicates an order in which the child resources are called when the parent resource is called.

6. The apparatus of claim 5, wherein the order indicated by the arrangement of the child resources specifies a first of the child resources is called before a second of the child resources is called.

7. The apparatus of claim 5, wherein the order indicated by the arrangement of the child resources is periodic in that the child resources are repeatedly called over the duration of the parent resource.

8. The apparatus of claim 1, wherein the times specified by the response strategy indicate an arrangement of the resources, and the arrangement indicates an order in which the resources are called to execute the one or more measures.

9. The apparatus of claim 8, wherein the order indicated by the arrangement of the resources is periodic in that the resources are repeatedly called over the duration of the demand event.

10. The apparatus of claim 8, wherein the times specified by the response strategy indicate durations for which the one or more measures are executed by respective ones of the resources, and the durations indicate a reverse order in which the respective ones of the resources cease to execute the one or more measures.

11. The apparatus of claim 8, wherein the times are specified and the resources thereby organized based on one or more of a weather season, an environmental condition, a building use, an occupancy density, or a user preference.

12. The apparatus of claim 8, wherein the times are specified and the resources thereby organized based on measurements from a sensor, and the measurements indicate an occupancy level, a humidity condition, or an amount of a volatile organic compound.

13. The apparatus of claim 1, wherein the demand event is a first demand event, and the response strategy is a first response strategy that is established for the first demand event, and the processor is configured to execute the computer-readable program code to cause the apparatus to further at least:
establish a second response strategy for a second demand event, the arrangement of the resources indicated by the times specified by the second response strategy indicating a different order in which the resources are called to execute the one or more measures; and
execute the second response strategy to reduce the demand on the power grid from the load facility during the second demand event.

14. The apparatus of claim 1, further in which the apparatus is caused to activate a user forced rotation strategy, the user forced rotation strategy being activated by user input and when activated causing a deviation from executing the response strategy, the deviation resulting in a call executing the one or more measures of a given resource to cease and another call to execute the one or more measures of a different resource to be initiated.

15. A method of controlling demand on a power grid from a load facility in response to a demand event, the load facility including electrical devices that are powered from power drawn from the power grid, the method comprising:
defining a plurality of resources of the load facility based on user input, each resource including one or more of the electrical devices and one or more measures to reduce power consumption of the one or more of the electrical devices to decrease demand on the power grid;
establishing a response strategy for the demand event, including:
selecting resources from the plurality of resources to respond to the demand event; and
organizing the resources into the response strategy that specifies the resources and times during the demand event at which the resources are called to execute the one or more measures to reduce the power consumption of the one or more of the electrical devices to decrease demand on the power grid, different ones of the resources called at different times during the demand event, and at least one of the resources called to execute the one or more measures for a duration that is shorter than the demand event; and
executing the response strategy to reduce demand on the power grid from the load facility during the demand event.

16. The method of claim 15, wherein the resources are selected based on one or more of a weather season, an environmental condition, a building use, an occupancy density, or a user preference.

17. The method of claim 15, wherein the resources are organized based on user input.

18. The method of claim 15, wherein the plurality of resources that are defined include a parent resource with multiple other resources that are child resources of the parent resource, and
wherein the resources that are selected include the parent resource.

19. The method of claim 18, wherein defining the plurality of resources includes:
selecting the child resources from the plurality of resources; and
organizing the child resources into the parent resource that specifies the child resources and an arrangement of the child resources, and the arrangement indicates an order in which the child resources are called when the parent resource is called.

20. The method of claim 19, wherein the order indicated by the arrangement of the child resources specifies a first of the child resources is called before a second of the child resources is called.

21. The method of claim 19, wherein the order indicated by the arrangement of the child resources is periodic in that the child resources are repeatedly called over the duration of the parent resource.

22. The method of claim 15, wherein the times specified by the response strategy indicate an arrangement of the resources, and the arrangement indicates an order in which the resources are called to execute the one or more measures.

23. The method of claim 22, wherein the order indicated by the arrangement of the resources is periodic in that the resources are repeatedly called over the duration of the demand event.

24. The method of claim 22, wherein the times specified by the response strategy indicate durations for which the one or more measures are executed by respective ones of the resources, and the durations indicate a reverse order in which the respective ones of the resources cease to execute the one or more measures.

25. The method of claim 22, wherein the times are specified and the resources thereby organized based on one or more of a weather season, an environmental condition, a building use, an occupancy density, or a user preference.

26. The method of claim 22, wherein the times are specified and the resources thereby organized based on measurements from a sensor, and the measurements indicate an occupancy level, a humidity condition, or an amount of a volatile organic compound.

27. The method of claim 15, wherein the demand event is a first demand event, and the response strategy is a first response strategy that is established for the first demand event, and the method further comprises:

establishing a second response strategy for a second demand event, the arrangement of the resources indicated by the times specified by the second response strategy indicating a different order in which the resources are called to execute the one or more measures; and executing the second response strategy to reduce the demand on the power grid from the load facility during the second demand event.

28. The method of claim 15, further comprising activating a user forced rotation strategy, the user forced rotation strategy being activated by user input and when activated causing a deviation from executing the response strategy, the deviation resulting in a call executing the one or more measures of a given resource to cease and another call to execute the one or more measures of a different resource to be initiated.

* * * * *